United States Patent [19]
Lichte

[11] 3,907,191
[45] Sept. 23, 1975

[54] METHOD OF CONSTRUCTING A ROTARY ROCK BIT

[75] Inventor: Carl Laurent Lichte, Dallas, Tex.

[73] Assignee: Dresser Industries, Inc., Dallas, Tex.

[22] Filed: Oct. 24, 1973

[21] Appl. No.: 409,208

[52] U.S. Cl. .............. 228/182; 228/196; 228/212; 219/121 EM; 175/375; 76/108 A; 29/464
[51] Int. Cl.² .................. B23K 15/00; B23K 37/04
[58] Field of Search .......... 29/445, 464, 559, 471.1, 29/493; 76/108 A; 175/375; 219/121 EM

[56] References Cited
UNITED STATES PATENTS

| | | | |
|---|---|---|---|
| 2,321,484 | 6/1943 | Harrington | 175/375 X |
| 2,807,444 | 9/1957 | Reifschneider | 175/339 |
| 2,831,661 | 4/1958 | Brown | 175/340 |
| 3,400,243 | 9/1968 | McNabb | 219/121 EB |

Primary Examiner—Al Lawrence Smith
Assistant Examiner—K. J. Ramsey
Attorney, Agent, or Firm—Eddie E. Scott

[57] ABSTRACT

A rotary rock bit is constructed from a multiplicity of individual segments. Each individual segment includes two parting faces and a gage cutting surface. The individual segments are positioned adjacent each other with the parting faces of the adjacent segments in abutting relationship to one another. A ring gage is positioned around the segments and the individual segments are moved relative to one another causing the parting faces of an individual segment to slide against the parting faces of the adjacent segments. The segments are moved until the gage cutting surfaces of the segments contact the ring gage thereby insuring that the finished bit will have the desired gage size. The segments are welded together over a substantial portion of the parting faces.

8 Claims, 4 Drawing Figures

METHOD OF CONSTRUCTING A ROTARY ROCK BIT

BACKGROUND OF THE INVENTION

The present invention relates to the earth boring art and more particularly to a method of constructing a rotary rock bit.

A rotary rock bit in general consists of a main bit body adapted to be connected to a rotary drill string. Cutter means connected to the main bit body contact the formation during the drilling operation to form the desired bore hole. Rotary rock bits have traditionally been constructed from a multiplicity of segments. The multiplicity of segments have been positioned together with a multiplicity of longitudinal seams between adjacent segments. Shims have been positioned between the segments to size the bits to the proper gage size. A weld groove between the adjacent segments has been filled with a weld deposit by a welding process. The segments are joined together strictly by the weld deposit. The gage diameter of the prior art bits has not been precisely uniform and the non-uniformity of the gage diameter has been a consistent problem.

A rotary rock bit must operate under extremely harsh environmental conditions and must effectively disintegrate very hard formations to produce the desired bore hole. The gage size of the bits must be precise. In some operations the bit must pass through casings with a minimum clearance. In other operations, it is necessary for the bit to pass through bored and still open holes which may be within a few thousandths of an inch of the gage diameter of the bit. If the gage size of the bits varies during the manufacturing process, the bits will encounter problems during the drilling operation.

DESCRIPTION OF PRIOR ART

In U.S. Pat. No. 2,807,444 to W. H. Reifschneider, patented Sept. 24, 1957, a rotary earth boring drill is shown and claimed in which the bit head is formed of a plurality of arcuate segments each of said segments being asymmetric and comprising a body portion having a downwardly extending leg and a downwardly extending hollow boss in side-by-side relation thereon, there being a passage communicating between the interior of the bit head and bores of the bosses.

In U.S. Pat. No. 2,831,661 to G. R. Brown, patented Apr. 22, 1958, a drill bit consisting of three segmental elements which are adapted to fit together to constitute a bit is shown. After forging, the segmental elements are machined to afford accurately meeting surfaces when the elements are assembled together. The margins which represent the meeting of the segments are given a chamfer for providing a weld groove. The three segmental elements are assembled in a jig and welding is carried out along the groove.

In U.S. Pat. No. 2,778,926 to W. H. Schneider, patented Jan. 22, 1957, a method for welding and soldering by bombarding by electrons the engaging surfaces of two parts to be connected is shown. The method disclosed shows a system for soldering, welding, or sintering suitable materials by heating the parts to be connected with a beam of electrons.

Prior art rotary rock bits have been constructed from a multiplicity of separate segments. The segments have been positioned together with dowels between segments to insure that the segments will be properly aligned. Shims have been positioned between the segments to bring the cutters to the desired gage diameter. In some instances the dowels have been contained in large holes in the segments and a limited amount of movement of the segments has been available. The segments have been moved within the confines of the dowels to adjust the gage size. The movement has been about the dowels with the dowels acting as pivots. It should be apparent, therefore, that while some small movement may have been available on occasion in the prior art to adjust the gage size within narrow limits, that movement was always restricted to the extent of the dowel holes. Consequently, the dowels prevented the unrestricted sliding movement of adjacent segments relative to one another which, in accordance with this invention, has been found necessary to precisely adjust to any desired gage size, as will be more fully explained hereinafter.

SUMMARY OF THE INVENTION

The present invention provides a method of constructing a rotary rock bit that will insure that the bit will have a precise gage size. The rock bit is constructed from a multiplicity of individual segments with each of the individual segments having individual parting faces and a gage cutting surface. The individual segments are positioned adjacent one another with the parting faces of the adjacent segments in abutting relationship to one another. The individual segments are moved relative to one another thereby causing the parting faces of an individual segment to slide against the parting faces of the next adjacent segments until the gage cutting surfaces of the segments are at the desired gage size. The segments are welded together providing a finished bit that has a precise gage diameter. The above and other features and advantages of the present invention will become apparent from a consideration of the following detailed description of the invention when taken in conjunction with the drawings.

DETAILED DESCRIPTION OF THE INVENTION

Figure 1:
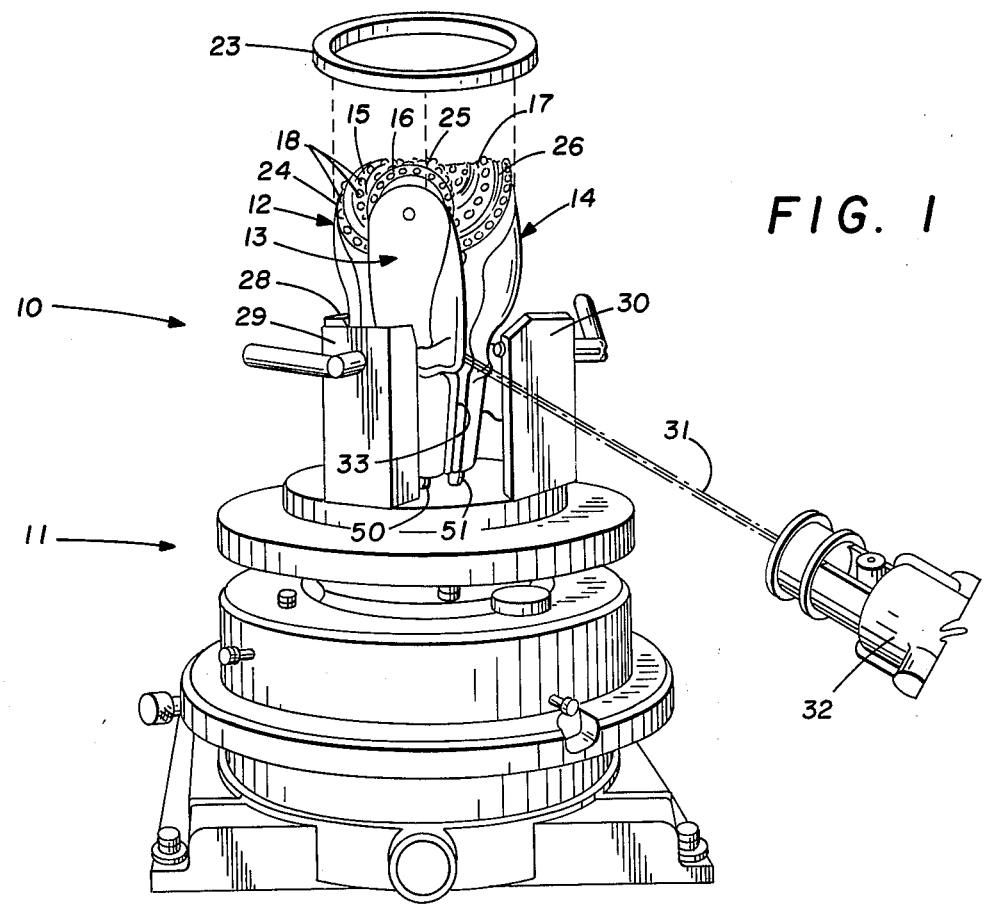
FIG. 1 shows three individual segments of a rotary rock bit positioned together for welding.

Referring now to FIG. 1 a rotary rock bit generally designated by the reference number 10 is shown positioned in a positioning fixture generally designated by the reference number 11. The rotary rock bit 10 consists of three individual segments 12, 13 and 14 positioned together. When completed the bit will be adapted to be connected to a rotary drill string by a threaded connection and used to disintegrate earth formations for drilling well bores and the like. Each of the segments 12, 13, and 14 includes a rotatable cone cutter 15, 16 and 17, respectively, that is adapted to rotate as the bit contacts the formation. A multiplicity of inserts 18 are located on the exterior surface of the rotatable cone cutter 15, 16, and 17 for disintegrating the formations.

Figure 2:
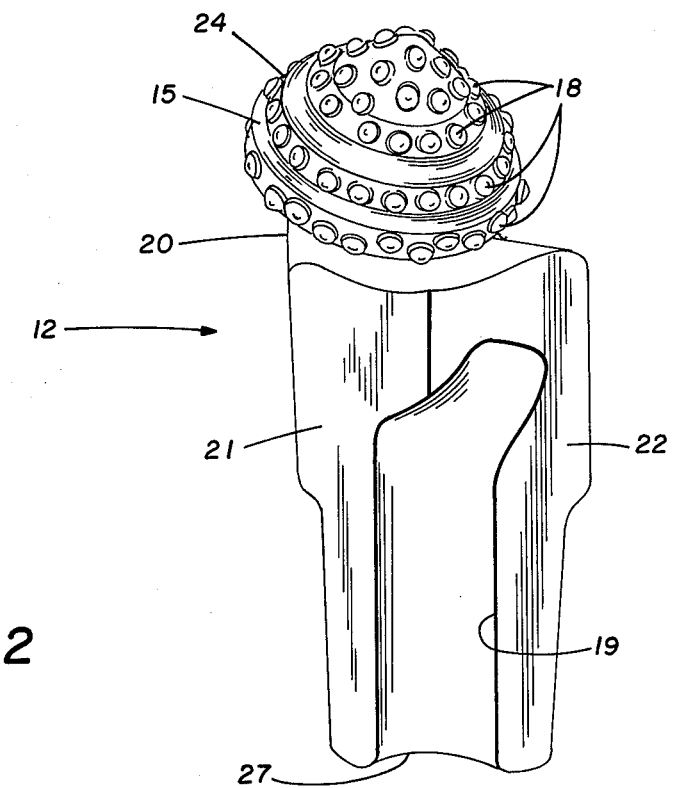
FIG. 2 shows one of the individual segments of the rotary rock bit shown in FIG. 1.

Referring now to FIG. 2, one of the segments 12 is shown individually. The segment 12 constitutes one third of the rotary rock bit 10. A portion 19 of the central passageway that extends through the rotary rock bit 10 is shown. The passage allows drilling mud to be transmitted through the rock bit to the bottom of the well bore for removing cuttings and cooling the bit. The segment 12 includes an arm 20 that terminates in a bearing pin (not shown). The rotatable cone cutter 15 is positioned upon the bearing pin and adapted to rotate thereon. Bearings (not shown) between the bearing pin and the cutter 15 facilitate rotation of the cutter 15. The multiplicity of inserts 18 located on the exterior surface of the cutter 15 disintegrate the formations as the bit is rotated and moved through the formations. The segment 12 includes individual parting faces 21 and 22.

Referring now to both FIGS. 1 and 2, the parting faces 21 and 22 of segment 12 are positioned in abutting relationship to parting faces (not shown) on segments 13 and 14. A parting face (not shown) on segment 13 is also in abutting relationship to a parting face (not shown) on segment 14.

In order to insure that bit 10 has the proper gage size, a ring gage 23 is positioned around the cutters 15, 16 and 17. The segments 12, 13 and 14 are moved outward thereby causing the parting faces of an individual segment to slide against the parting faces of the next adjacent segments until the gage cutting surfaces 24, 25 and 26 of the segments 12, 13 and 14 contact the ring gage 23. For example, the parting face 21 of segment 12 will slide against the abutting parting face on segment 13 and the parting face 22 on segment 12 will slide against the abutting parting face on segment 14 until the gage cutting surface 24 contacts the ring gage 23. The end of the shank 27 of segment 12 remains substantially in the same position relative to the ends of the shanks of the other two segments 13 and 14 and the segments 12, 13 and 14 are scissored to bring the gage cutting surfaces 24, 25 and 26 against the ring gage 23. Referring to FIG. 1, the segment 12 pivots about a projecting key (not shown) on the fixture 11. The segment 13 pivots about a projecting key 50 on the fixture 11 and the segment 14 pivots about a projecting key 51 on the fixture 11.

If the bit 10 is to be an offset bit, the scissoring of segments 12, 13, and 14 in one direction will cause the cone cutters 15, 16 and 17 to move to a non-offset position and the gage cutting surfaces 24, 25 and 26 will move away from the ring gage 23. When the segments 12, 13 and 14 are scissored in the opposite direction, the cone cutters 15, 16 and 17 will move to a greater offset position and the gage cutting surfaces 24, 25, and 26 will come into contact with the ring gage 23 to provide the bit 10 with a precise gage diameter. A precise gage size is provided by the method of the present invention and is a substantial improvement over the method of the prior art where various size shims were inserted between the separate segments to bring the bit to the appropriate gage size.

The positioning fixture 11 includes clamping jaws 28, 29 and 30 that maintain the segments 12, 13 and 14 in the proper position for welding. The segments 12, 13 and 14 are welded together by a suitable welding process. For example, a beam of high velocity electrons is directed into the seams between the individual segments 12, 13 and 14 to fuse the segments together. As shown in FIG. 1, the beam 31 from the electron beam gun 32 is directed into the seam 33 between segment 13 and segment 14. Because of the high intensity of the electron beam ($10KWmn^2$) and its high-powered capability (60KW) the width of the area acted on between the segments is much narrower than that found in prior art rock bits. In addition, the electron beam gun 32 produces a beam that penetrates substantially throughout the area to be joined. The fixture 11 will index the bit 10 to a position where the seam (not shown) between the segments 12 and 14 is aligned with the beam 31. After that seam is welded the fixture 11 will index the bit 10 to a position where the seam (not shown) between the segments 12 and 13 is aligned with the beam 31.

Figure 3:
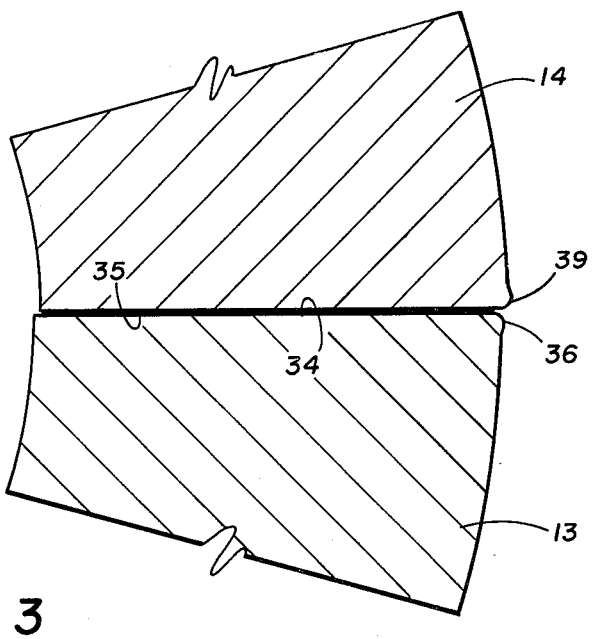
FIG. 3 is a cross section of the weld between two of the segments of the rotary rock bit shown in FIG. 1.

Referring now to FIG. 3, a horizontal-sectional view of the weld between the segments 13 and 14 is shown. The horizontal-sectional view is taken approximately in the middle of the bit 10. The segment 13 is located next to the segment 14. A face 34 on segment 13 is in abutting relationship to a face 35 on segment 14. The segments 13 and 14 are joined throughout substantially all of said faces 34 and 35. Ridges 36 and 37 are formed on the segments 13 and 14 respectively by the flash left from the forging of segments 13 and 14. Shims are not used to size the bit to the proper gage size. The scissoring of segments 13 and 14 has resulted in segments 13 and 14 being slightly misaligned.

Figure 4:
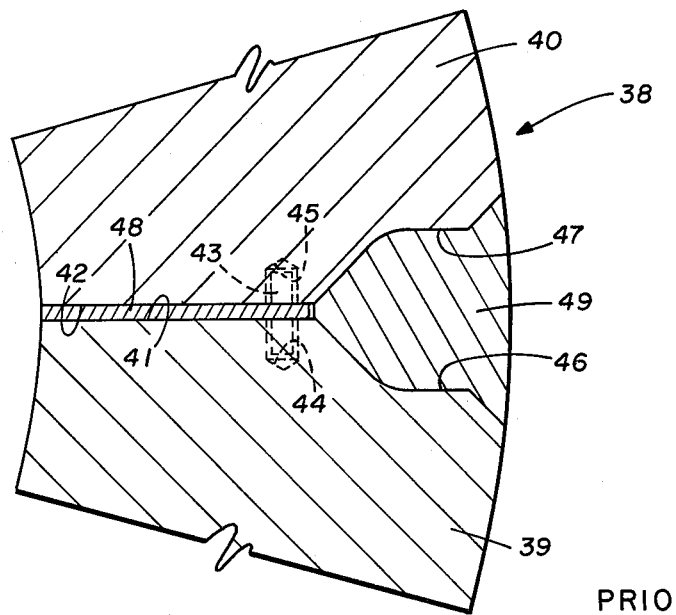
FIG. 4 is a cross section of a prior art weld.

Referring now to FIG. 4, a cross-sectional view of the weld area of prior art rotary rock bit 38 is shown. The segment 39 is positioned proximate the segment 40. A face 41 on segment 39 is opposite a face 42 on segment 40. A dowel 43 extends into a hole 44 in segment 39 and into a hole 45 in segment 40. The dowel 43 is used to align the segments of the prior art bit 38 in the proper position for welding. The segment 39 includes a section 46 that will, when combined with the matching section 47 on segment 40, form a weld groove. As previously explained, the bit should have an accurate gage diameter. In order to size the bit to the proper gage diameter, the shim 48 is positioned between the faces 41 and 42. Various numbers of shims will be required in the bit depending upon the adjustment needed to bring the bit to the proper gage size. It will be noted that the holes 44 and 45 are somewhat larger than the dowel 43. It has been known in the prior art that some relatively small amount of adjustment in the gage size of the bit could be obtained by scissoring the bit within the confines of the dowel. However, as previously explained, the dowels prevented the unrestricted sliding movement of adjacent segments relative to one another which is necessary in order to precisely adjust to any desired gage size while maintaining the parting faces of adjacent segments in abutting relation.

The weld groove formed by the sections 46 and 47 is filled with a weld deposit 49. It will be noted that the faces 41 and 42 are not connected by a weld and that the segments 39 and 40 are joined solely by the weld deposit 49. The cross section of the weld deposit 49 is in the form of an irregular multi-sided polygon. The shape of the weld is subjected to complicated stress forces and the fatigue life is shorter than the fatigue life of the weld shown in FIG. 3. The use of shims does not allow bits to be constructed with a precisely uniform gage size.

The embodiments of the invention in which an exclusive property or privilege is claimed are defined as follows:

1. A method of constructing a rotary rock bit with an accurate gage size from a multiplicity of individual segments wherein each of the individual segments includes individual parting faces and a gage cutting surface, comprising the steps of:

placing the individual segments adjacent one another with the surfaces of the parting faces of the adjacent segments in abutting relationship to one another, sliding the individual segments relative to one another thereby causing unrestricted movement of the parting faces of an individual segment against the parting faces of the next adjacent segments over substantially the entire surfaces of said abutting faces until the gage cutting surfaces of the segments are at the desired gage size, and welding the segments together.

2. A method of constructing a rotary rock bit from a multiplicity of individual segments wherein each of the individual segments includes individual parting faces and a gage cutting surface, comprising the steps of:

placing the individual segments adjacent one another with the parting faces of the adjacent segments in abutting relationship to one another, moving the individual segments relative to one another causing unrestricted movement of the parting faces of an individual segment against the parting faces of the next adjacent segments until the gage cutting surfaces of the segments are at the desired gage size, and welding the segments together over a substantial portion of the parting faces.

3. A method of constructing a rotary rock bit with an accurate gage size from a multiplicity of individual segments wherein each of the individual segments includes individual parting faces and a gage cutting surface, comprising the steps of:

placing the individual segments adjacent one another with the parting faces of the adjacent segments in abutting relationship to one another, positioning a sizing means proximate said gage cutting surfaces, moving the individual segments relative to one another thereby causing the parting faces of an individual segment to slide against the parting faces of the next adjacent segments until the gage cutting surfaces of the segments come into contact with said sizing means and are at the desired gage size, and welding the segments together.

4. A method of constructing a rotary rock bit with an accurate gage size from a multiplicity of individual segments wherein each of the individual segments includes individual parting faces and a gage cutting surface, comprising the steps of:

assembling the individual segments adjacent one another with the parting faces of the adjacent segments in abutting relationship to one another;

disposing a sizing means in operative position about the assembled segments;

moving the individual segments relative to one another outwardly toward the sizing means thereby causing the parting faces of an individual segment to slide against the parting faces of the next adjacent segments until the gage cutting surfaces of the segments engage the sizing means; and welding the segments together.

5. The method of claim 4 wherein said step of moving the individual segments relative to one another consists of scissoring the segments with respect to one another.

6. The method of claim 4 wherein each of said segments has an end portion spaced from said gage cutting surface and said step of scissoring said segments consists of pivoting said segments about said end portion.

7. A method of constructing a rotary rock bit from a multiplicity of individual segments wherein each of the individual segments includes a gage cutting surface, a shank portion, and individual parting faces, comprising the steps of:

placing the individual segments adjacent one another with the parting faces of the adjacent segments in abutting relationship to one another.

moving the individual segments relative to one another by pivoting the individual segments about said shank portion thereby causing the parting faces of an individual segment to slide against the parting faces of the next adjacent segments until the gage cutting surfaces of the segments are at the desired gage size, and welding the segments together.

8. A method of constructing a rotary rock bit with an accurate gage size from a first segment including first segment individual parting faces, a first segment gage cutting surface, and a first segment shank portion; a second individual segment including second individual segment parting faces, a second segment gage cutting surface, and a second segment shank portion; and a third individual segment including third segment individual parting faces, a third segment gage cutting surface, and a third segment shank portion; comprising the steps of:

placing said first, second, and third individual segments adjacent one another with a first segment parting face in abutting relationship to a second segment parting face, a second segment parting face in abutting relationship to a third segment parting face, and a third segment parting face in abutting relationship to a first segment parting face, moving said first, second, and third individual segments relative to one another by pivoting said first, second and third individual segments about said first, second and third shank portions thereby causing said first segment parting face to slide against said second segment parting face, said second segment parting face to slide against said third segment parting face, and said third segment parting face to slide against said first segment parting face until said first, second and third gage cutting surfaces are at the desired gage size, and welding the segments together.

\* \* \* \* \*